(12) United States Patent
Stedman et al.

(10) Patent No.: US 8,788,978 B2
(45) Date of Patent: Jul. 22, 2014

(54) PINCH ZOOM VELOCITY DETENT

(75) Inventors: Roy W. Stedman, Austin, TX (US); Deborah C. Russell, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 180 days.

(21) Appl. No.: 13/010,915

(22) Filed: Jan. 21, 2011

(65) Prior Publication Data

US 2012/0192116 A1 Jul. 26, 2012

(51) Int. Cl.
*G06F 3/033* (2013.01)

(52) U.S. Cl.
USPC .......................................... 715/863; 715/862

(58) Field of Classification Search
CPC ....................................................... G06F 3/033
USPC ................................................. 715/863, 862
See application file for complete search history.

(56) References Cited

U.S. PATENT DOCUMENTS

| | | | |
|---|---|---|---|
| 7,619,618 B2 | 11/2009 | Westerman et al. | |
| 7,782,307 B2 | 8/2010 | Westerman et al. | |
| 2004/0085294 A1* | 5/2004 | Michelitsch et al. | 345/156 |
| 2010/0079498 A1 | 4/2010 | Zaman et al. | |
| 2010/0123665 A1 | 5/2010 | Birkler | |
| 2011/0074828 A1* | 3/2011 | Capela et al. | 345/661 |
| 2011/0316884 A1* | 12/2011 | Giambalvo et al. | 345/660 |

* cited by examiner

*Primary Examiner* — Andrea Leggett
(74) *Attorney, Agent, or Firm* — Larson Newman, LLP

(57) ABSTRACT

An information handling system includes a gesture sensitive interface and a processor. The processor is configured to receive inputs from the gesture sensitive interface corresponding to first and second interaction points, determine a relative motion between the first and second interaction points, and obtain a velocity of the relative motion. The processor is further configured to determine if the velocity exceeds a threshold, and scale an image on a display from an initial magnification to a predetermined magnification when the velocity exceeds a threshold.

16 Claims, 3 Drawing Sheets

PINCH ZOOM VELOCITY DETENT

FIELD OF THE DISCLOSURE

This disclosure generally relates to information handling systems, and more particularly relates to a pinch zoom velocity detent.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
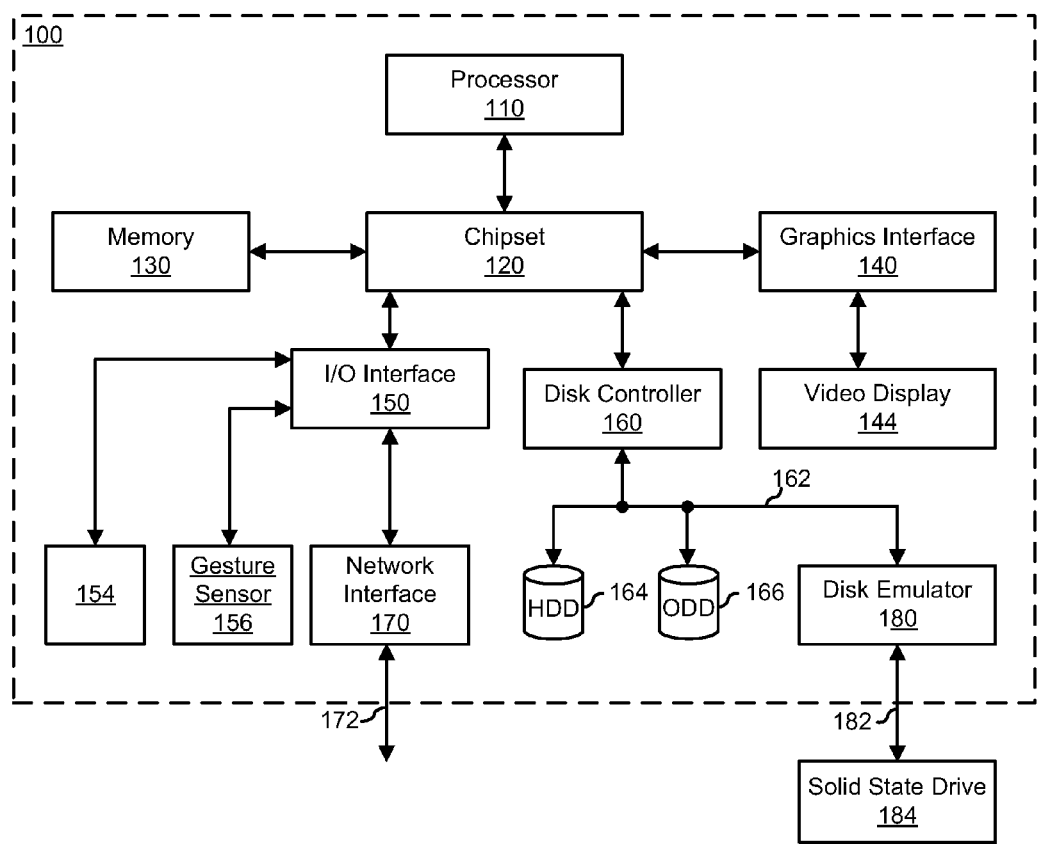
FIG. 1 illustrates a block diagram of an information handling system according to one aspect of the disclosure.

FIG. 1 illustrates a functional block diagram of an embodiment of an information handling system, generally designated as 100. Information handling system 100 includes processor 110, a chipset 120, a memory 130, a graphics interface 140, an input/output (I/O) interface 150, a disk controller 160, a network interface 170, and a disk emulator 180.

Processor 110 is coupled to chipset 120. Chipset 120 supports processor 110, allowing processor 110 to process machine-executable code. In a particular embodiment, information handling system 100 includes one or more additional processors, and chipset 120 supports the multiple processors, allowing for simultaneous processing by each of the processors, permitting the exchange of information between the processors and the other elements of information handling system 100. Processor 110 can be coupled to chipset 120 via a unique channel, or via a bus that shares information between processor 110, chipset 120, and other elements of information handling system 100.

Memory 130 is coupled to chipset 120. Memory 130 can be coupled to chipset 120 via a unique channel, or via a bus that shares information between chipset 120, memory 130, and other elements of information handling system 100. In particular, a bus can share information between processor 110, chipset 120 and memory 130. In a particular embodiment, processor 110 is coupled to memory 130 through a unique channel. In accordance with another aspect, an information handling system can include a separate memory dedicated to each of the processors. A non-limiting example of memory 130 includes static, dynamic, or non-volatile random access memory (SRAM, DRAM, or NVRAM), read only memory (ROM), flash memory, another type of memory, or any combination thereof.

Graphics interface 140 is coupled to chipset 120. Graphics interface 140 can be coupled to chipset 120 via a unique channel, or via a bus that shares information between chipset 120, graphics interface 140, and other elements of information handling system 100. Graphics interface 140 is coupled to a video display 144. Other graphics interfaces can also be used in addition to graphics interface 140 if needed or desired. Video display 144 can include one or more types of video displays, such as a flat panel display or other type of display device.

I/O interface 150 is coupled to chipset 120. I/O interface 150 can be coupled to chipset 120 via a unique channel, or via a bus that shares information between chipset 120, I/O interface 150, and other elements of information handling system 100. Other I/O interfaces can also be used in addition to I/O interface 150 if needed or desired. I/O interface 150 is coupled to one or more add-on resources 154. Add-on resource 154 can also include another data storage system, a graphics interface, a network interface card (NIC), a sound/video processing card, another suitable add-on resource or any combination thereof.

In an embodiment, I/O interface 150 can be coupled to a gesture sensor 156. Gesture sensor 156 can be capable of tracking at least two interaction points within a region of interest. For example, the gesture sensor can be a multi-touch surface, such as a track pad or a touch screen. In another example, the gesture sensor can be a camera system, such as a two-dimension or three-dimension camera system, capable of tracking movement of two or more objects in a visual field. In yet another example, the gesture sensor can include a system of motion sensors and proximity sensors that can be coupled to objects to track their movement, such as gloves that can be worn by a user to track hand motions.

Network interface device 170 is coupled to I/O interface 150. Network interface 170 can be coupled to I/O interface 150 via a unique channel, or via a bus that shares information between I/O interface 150, network interface 170, and other elements of information handling system 100. Other network interfaces can also be used in addition to network interface 170 if needed or desired. Network interface 170 can be a NIC disposed within information handling system 100, on a main circuit board (such as a baseboard, a motherboard, or any combination thereof), integrated onto another component such as chipset 120, in another suitable location, or any combination thereof. Network interface 170 includes a network channel 172 that provide interfaces between information handling system 100 and other devices that are external to information handling system 100. Network interface 170 can also include additional network channels.

Disk controller 160 is coupled to chipset 110. Disk controller 160 can be coupled to chipset 120 via a unique channel, or via a bus that shares information between chipset 120, disk controller 160, and other elements of information handling system 100. Other disk controllers can also be used in addition to disk controller 160 if needed or desired. Disk controller 160 can include a disk interface 162. Disk controller 160 can be coupled to one or more disk drives via disk interface 162. Such disk drives include a hard disk drive (HDD) 164 or an optical disk drive (ODD) 166 (such as a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 160 can be coupled to disk emulator 180. Disk emulator 180 can permit a solid-state drive 184 to be coupled to information handling system 100 via an external interface. The external interface can include industry standard busses (such as USB or IEEE 1384 (Firewire)) or proprietary busses, or any combination thereof. Alternatively, solid-state drive 184 can be disposed within information handling system 100.

In a particular embodiment, HDD 144, ODD 166, solid state drive 184, or a combination thereof include a computer-readable medium in which one or more sets of machine-executable instructions such as software can be embedded. For example, the instructions can embody one or more of the methods or logic as described herein. In a particular embodiment, the instructions reside completely, or at least partially, within memory 130, and/or within processor 110 during execution by information handling system 100. Memory 130 and processor 110 can also include computer-readable media.

Figure 2:
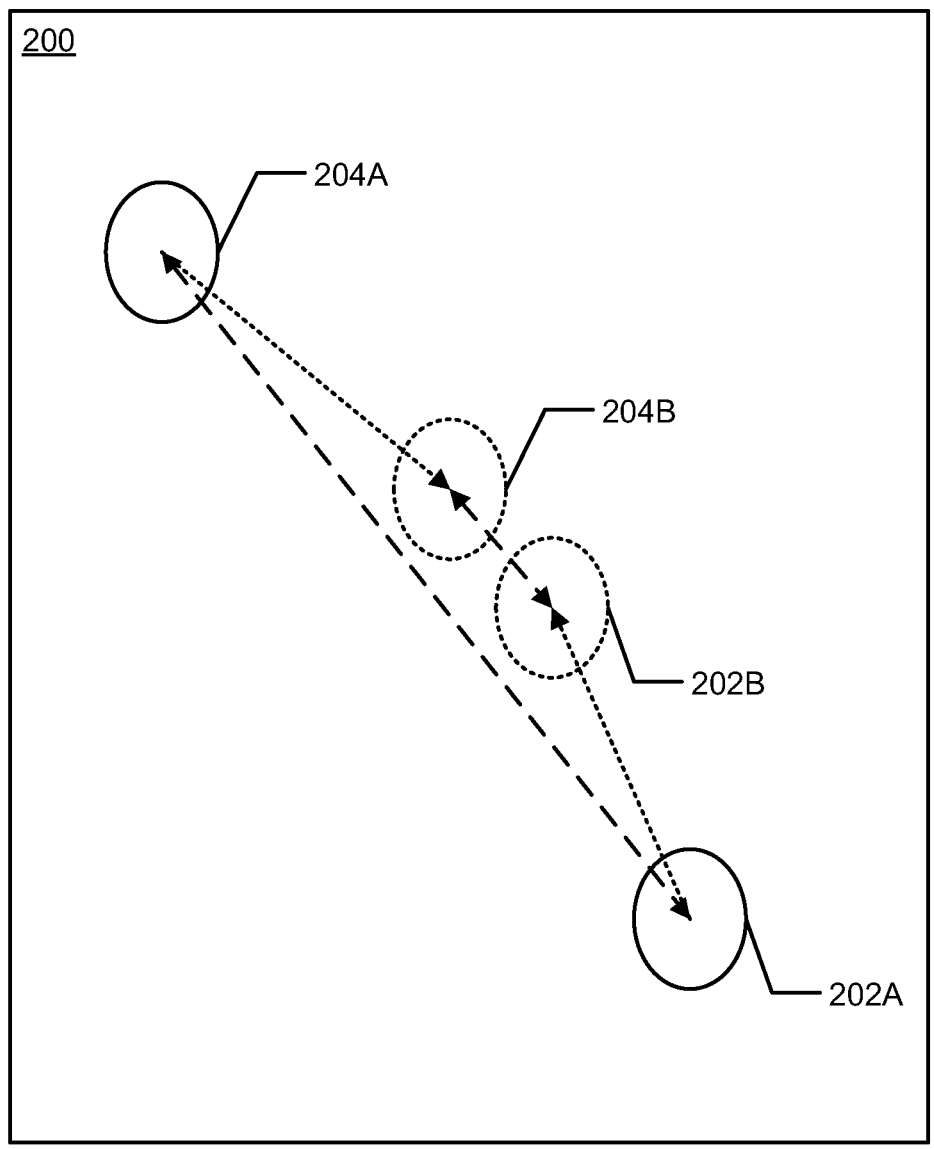
FIG. 2 is a diagram illustrating relative motion of points of interest according to one aspect of the disclosure.

FIG. 2 illustrates an exemplary gesture sensor 200, such as a touch pad, a touch screen or a camera system. The gesture sensor 200 can detect interaction points 202A and 204A. Interaction points 202A and 204A can be contact points on a touch surface, objects in a visual field, or sensors attached to objects to otherwise track movement through a region of interest. The gesture sensor 200 can track the movement of interaction points 202A and 204A to new locations 202B and 204B. Additionally, by tracking the movement of interaction points, the gesture sensor can track the relative movement between the two interaction points to determine if the interaction points have moved closer together or further apart.

In an embodiment, a user can performs a gesture, such as bringing two interaction points together or moving them apart. The gesture sensor can detect and quantify the gesture, such as by determining a magnitude and velocity of the gesture. When the velocity of the gesture is below a threshold, the magnification of an image on a display can be changed according to the magnitude of the gesture, such that a larger gesture could result in a larger change in the magnification of the image. Alternatively, when the velocity of the gesture exceeds a threshold, the magnification of the image can be changed to a predetermined level.

Figure 3:
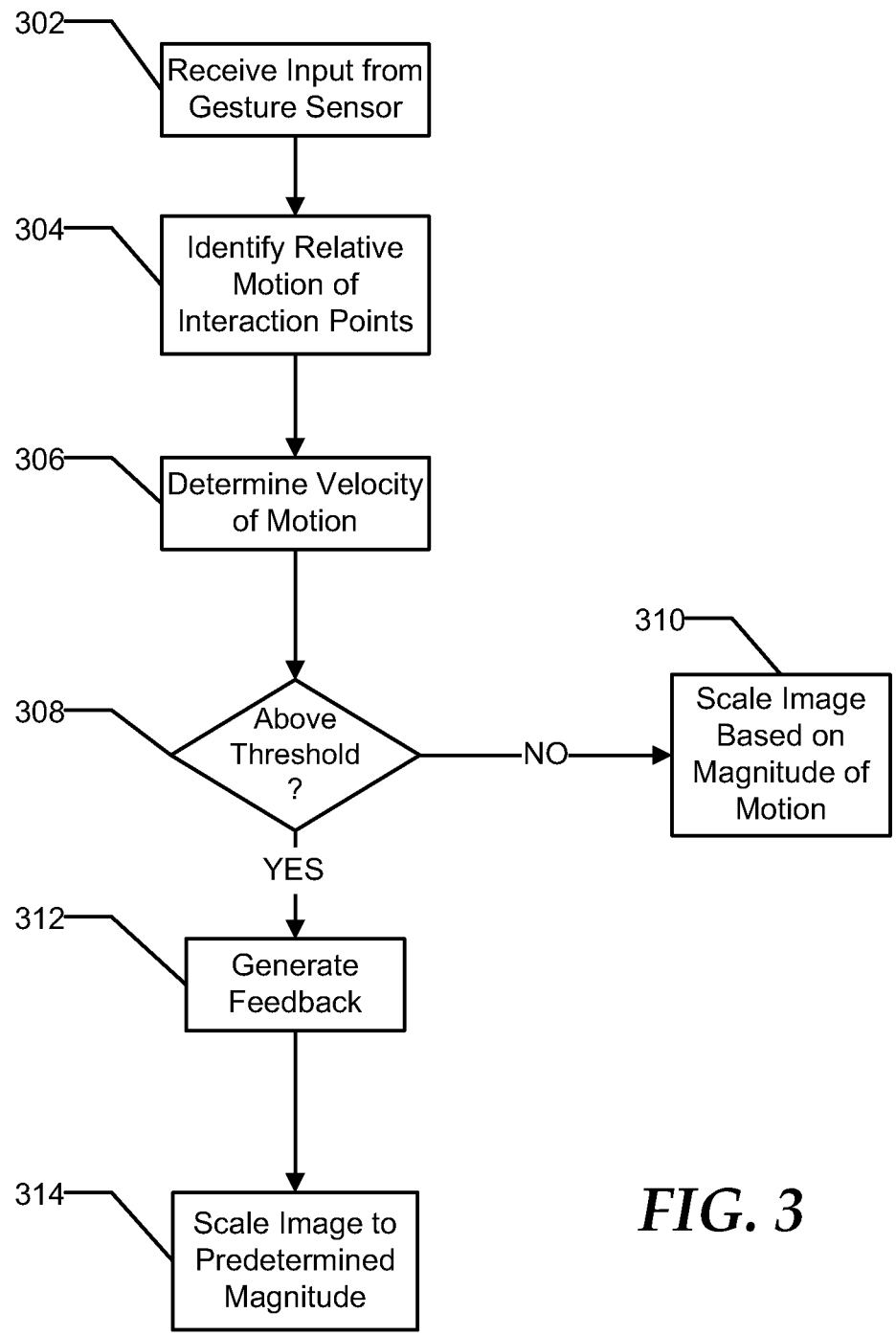
FIG. 3 is a flow diagram illustrating an exemplary method of processing relative motion of points according to one aspect of the disclosure.

FIG. 3 illustrates an exemplary method of processing a gesture. At 302, a gesture sensor can detect two or more interaction points. The gesture sensor can be a multi-touch surface, a camera system, or a system of motion sensors and proximity sensors capable of tracking interaction points, such as contact points on a touch surface, objects in a visual field, or the location of sensors attached to objects. At 304, the gesture sensor can detect a relative motion of the interaction points, such as the interaction points being moved closer together or further apart. In a particular example, bringing two or more interaction points closer together can reduce the magnification or shrink an image on a display while moving two or more interaction points further apart can increase the magnification or enlarge the image on the display. At 306, the velocity of the motion can be determined. The velocity can be determined based on an average velocity of the interaction points. Alternatively, the velocity can be determined based on the rate of change of the distance between the interaction points. At 308, the velocity can be compared to a threshold.

When the velocity does not exceed the threshold, an image can be scaled based on the magnitude of the relative motion between two or more interaction points, as illustrated at 310. For example, when the distance between the interaction points is decreased by half, the magnification of an image on a display can be decreased by half. Alternatively, when the distance between the interaction points is doubled, the magnification can be doubled.

Returning to 308, when the velocity exceeds the threshold, optionally, feedback may be generated to indicate the threshold has been exceed, as illustrated at 312. For example, the device may produce an audible tone or a haptic sensation to indicate a shift from a magnitude based response to a velocity based response. At 314, the image can be scaled to a predetermined magnitude. The predetermined magnitude may be a user defined setting, such as jumping to 100% zoom. Alternatively, the predetermined magnification may be a function of a font size and the display height. In an embodiment, the predetermined magnification may render a dominant font size of a document on the display at a predefined height. For example, a document in which a majority of the text is at a 12 point font size may be rendered on the display at a magnification sufficient to for the 12 point characters to have a height of about 2 mm, whereas a document with a dominant font size of 10 points may be rendered at a higher magnification to achieve the same 2 mm height for the 10 point characters. In a particular embodiment, the displayed height of the dominant font may be a user adjustable setting.

In a particular example, when a current magnification is greater than the predetermined size, the magnificent may jump to the predetermined size when the velocity of a zoom out gesture (bringing the interaction points closer together) exceeds the threshold. However, if the velocity of a zoom in gesture (moving the interaction points further apart) exceeds the threshold, the magnification may not jump to the predetermined size when the current magnification is greater than the predetermined size.

In another embodiment, there may be multiple predetermined magnifications, and zoom in or zoom out gestures may be used to jump between the predetermined magnifications when the velocity exceeds the threshold.

When referred to as a "device," the embodiments described above can be configured as hardware, or a combination of hardware and software. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could further include software, including firmware embedded at a device, such as a Pentium class or PowerPC™ brand processor, or other such device, or software capable of operating a relevant environment of the information handling system. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In a particular embodiment, an information handling system can be used to function as one or more of the network systems, or carry out one or more of the methods described above. In another embodiment, one or more of the systems described above can be implemented in the form of an information handling system.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a gesture sensitive interface; and
    a processor configured to:
        receive inputs from the gesture sensitive interface corresponding to first and second interaction points;
        determine a relative motion between the first and second interaction points;
        obtain a velocity of the relative motion based on an average velocity of the interaction points;
        determine if the velocity exceeds a threshold;
        determine a scaled magnification necessary to achieve a specified height for the rendered text of a document based on the font size and display size; and
        scale an image on a display from an initial magnification to the scaled magnification to achieve the specified height for the rendered text when the velocity exceeds the threshold.

2. The information handling system of claim 1, wherein the processor is further configured to scale the image on the display from the initial magnification to a new magnification when the velocity does not exceed the threshold, the new magnification being a function of the initial magnification and a magnitude of the relative motion.

3. The information handling system of claim 1, wherein the gesture sensitive interface is a touch interface, a motion interface, or an image-based interface.

4. The information handling system of claim 1, wherein the first and second interactions points are touch contacts, motion sensitive devices, or objects in a visual field.

5. The information handling system of claim 1, wherein the specified height is a user settable parameter.

6. The information handling system of claim 1, wherein the predetermined scaled magnification is greater than the initial magnification when the relative motion brings the first and second interaction points further apart.

7. The information handling system of claim 1, wherein the scaled magnification is less than the initial magnification when the relative motion brings the first and second interaction points closer together.

8. An information handling system comprising:
    a touch sensor;
    a display; and
    a processor configured to:
        receive inputs from the touch sensor corresponding to first and second contact points;
        determine a relative motion between the first and second contact points;
        obtain a velocity of the relative motion;
        determine if the velocity exceeds a threshold based on an average velocity of the contact points;
        initiate an audio feedback or a haptic feedback when the velocity exceeds the threshold;
        determine a font size defined for text of a document;
        determine a scaled magnification necessary to achieve a predetermined character height for rendered text of the document based on the font size and the display height; and
        scale an image on the display from an initial magnification to the scaled magnification when the velocity exceeds the threshold.

9. The information handling system of claim 8, wherein the processor is further configured to scale the image on the display from the initial magnification to a new magnification when the velocity does not exceed the threshold, the new magnification being a function of the initial magnification and a magnitude of the relative motion.

10. The information handling system of claim 8, wherein the predetermined character height is a user settable parameter.

11. The information handling system of claim 8, wherein the scaled magnification is greater than the initial magnification when the relative motion brings the first and second interaction points further apart.

12. A computer-implemented method comprising:
- receiving inputs from a gesture sensitive interface corresponding to first and second interaction points;
- determining a relative motion between the first and second interaction points;
- obtaining a velocity of the relative motion based on an average velocity of the interaction points;
- determining if the velocity exceeds a threshold;
- determine a scaled magnification sufficient to render characters on a display at a predetermined height, the scaled magnification a function of font size and display height; and
- scaling an image on a display from an initial magnification to the scaled magnification when the velocity exceeds the threshold.

13. The computer-implemented method of claim 12, wherein the gesture sensitive interface is a touch interface, a motion interface, or an image-based interface.

14. The computer-implemented method of claim 12, wherein the first and second interactions points are touch contacts, motion sensitive devices, or objects in a visual field.

15. The computer-implemented method of claim 12, wherein the processor is further configured to cause a feedback when the velocity exceeds the threshold.

16. The computer-implemented method of claim 12, wherein the predetermined height is a user settable parameter.

* * * * *